Patented May 5, 1931

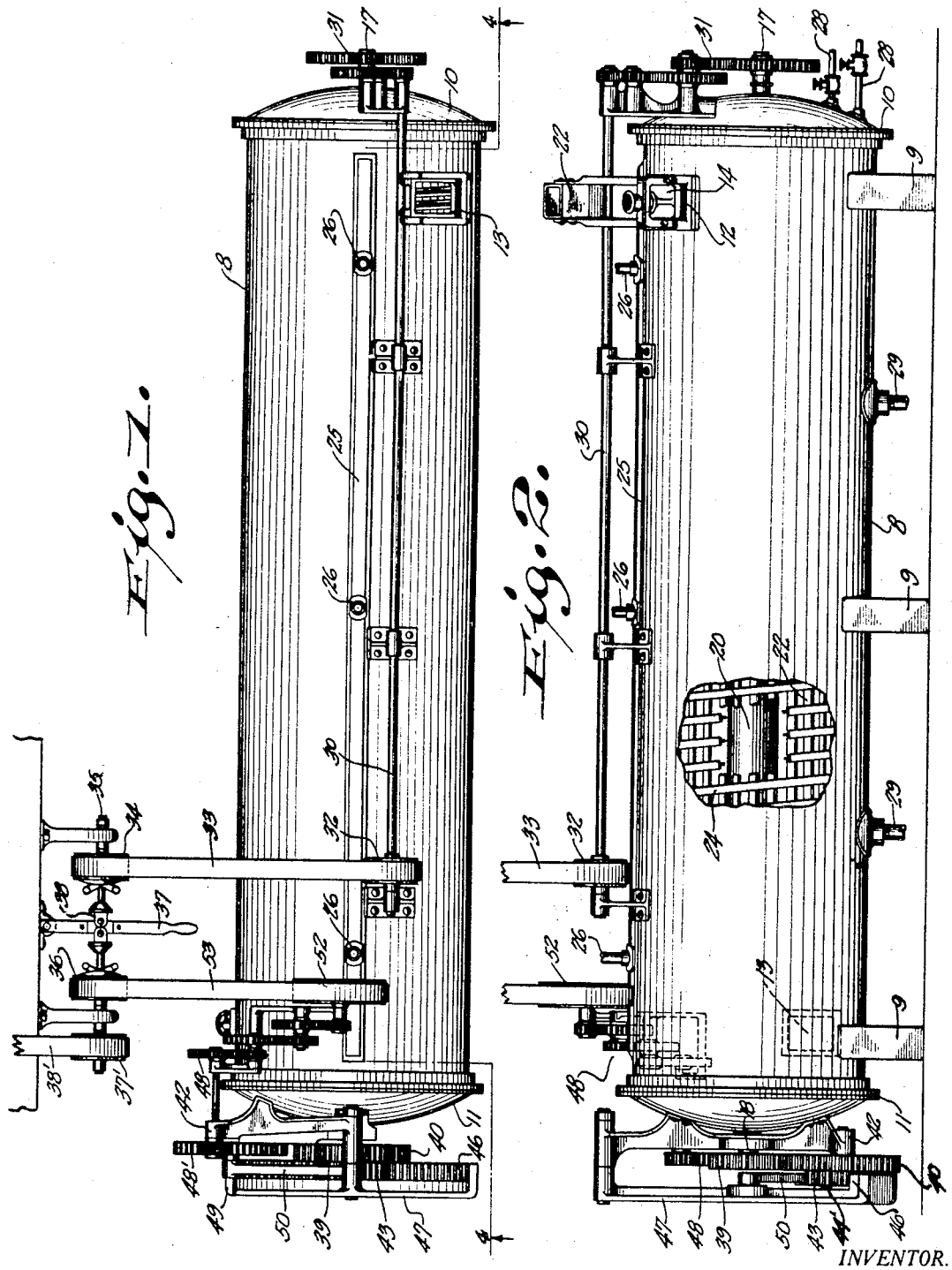

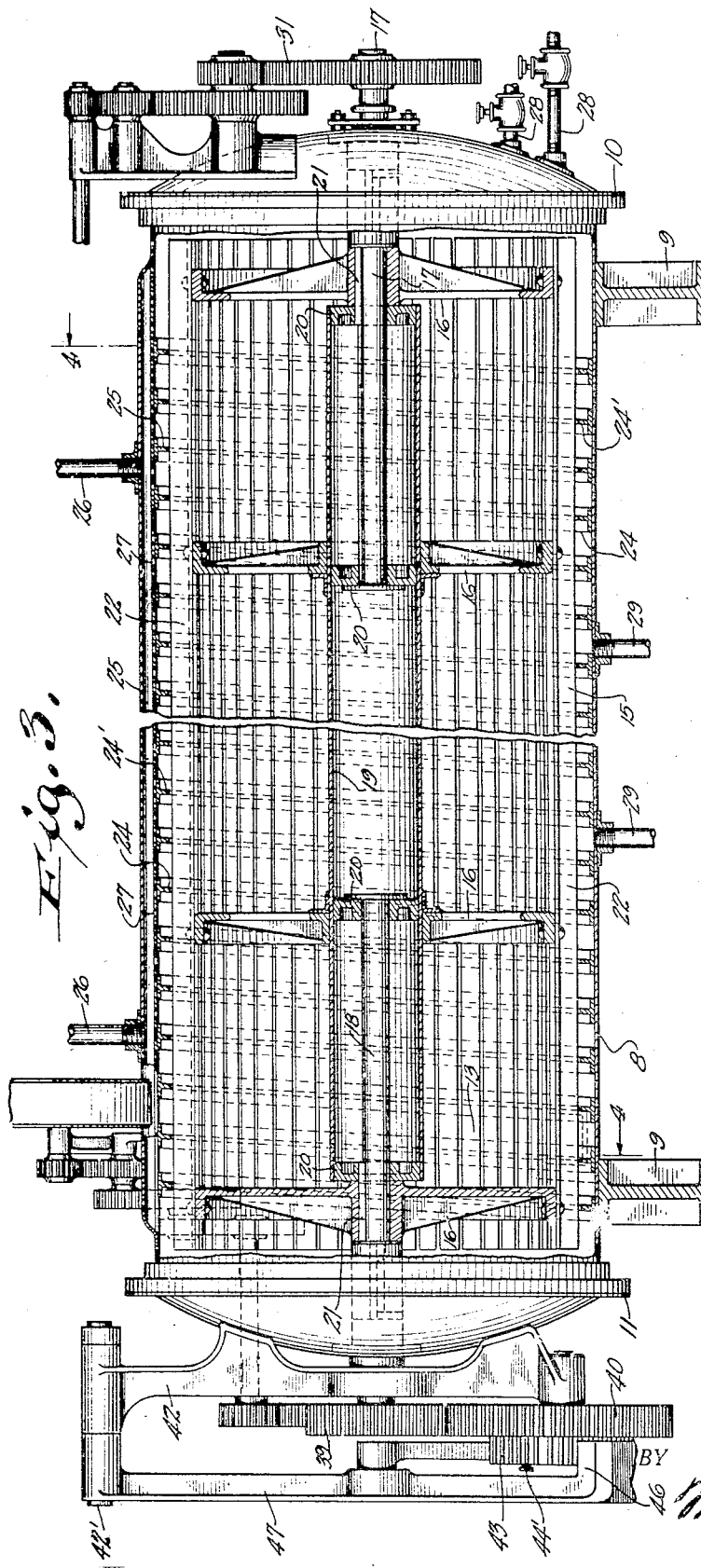

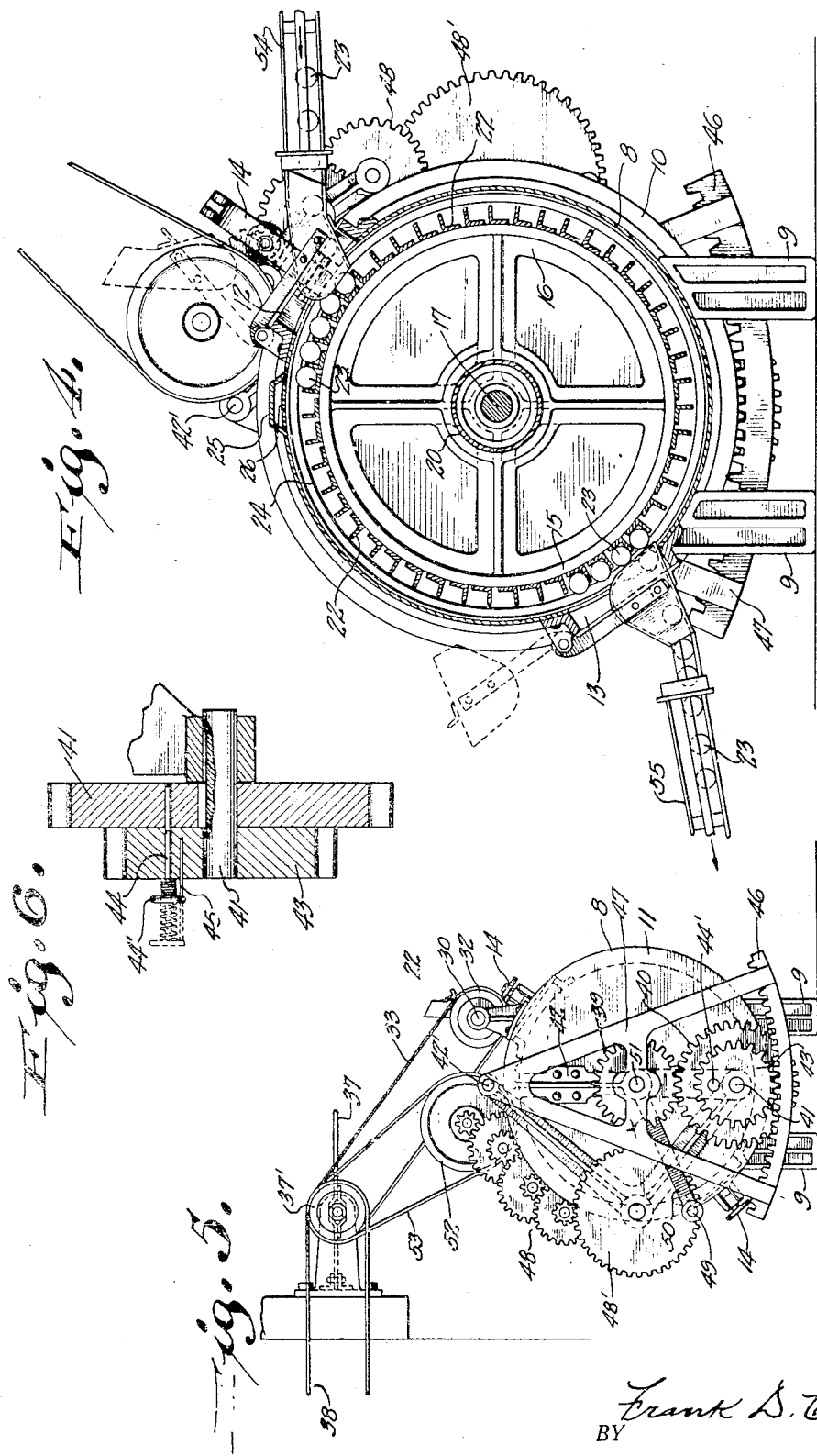

1,803,994

UNITED STATES PATENT OFFICE

FRANK D. CHAPMAN, OF BERLIN, WISCONSIN

AUTOMATIC COOKER

Application filed May 5, 1928. Serial No. 275,452.

This invention relates to improvements in automatic cookers, more particularly adapted for the cooking and sterilization of food, commonly known as processing, after the food has been placed in metal cans.

It is one of the objects of the present invention to provide an automatic cooker of the continuous type in which the drum for receiving the cans includes an inner carrier which is alternately rotated in opposite directions when desired, to agitate the cans of food being cooked.

A further object of the invention is to provide a line of automatic cookers which may be loaded from a line running continuously and to process the loaded batch, with optional agitation during the processing period.

A further object of the invention is to provide an automatic cooker having means for continuously rotating the interior carrier of the drum in one direction, and other means for alternately rotating the carrier in opposite directions.

A further object of the invention is to provide a series of automatic cookers which may be arranged in a series in connection with a continuously running can feeding and discharging mechanism to permit the feeding of cans to one drum while another is processing the cans of food and a third drum is discharging its processed cans, thus forming a continuous process.

A further object of the invention is to provide an automatic cooker in which food, and particularly milk, may be processed by increasing the steam pressure in the drums while the cans are being agitated, and while the temperature is maintained the agitation of the cans is stopped, and later in cooling the milk the cans are again agitated.

A further object of the invention is to provide a series of automatic cookers arranged to permit a variation in the process, that is agitation or nonagitation as desired, while the series of drums are in continuous operation.

A further object of the invention is to provide an automatic cooker having means above the cans for spraying the cans with stream or hot water to cook the food in the cans, or with cold water to cool the contents of the cans.

A further object of the invention is to provide an automatic cooker which is of simple construction, is strong and durable, and is well adapted for the purpose described.

With the above and other objects in view, the invention consists of the improved automatic cooker and its parts and combinations as set forth in the claims, and all equivalents thereof.

In the accompanying drawings in which the same reference characters indicate the same parts in all of the views:

Fig. 1 is a top view of the improved automatic cooker;

Fig. 2 is a side view thereof, parts broken away to show interior construction;

Fig. 3 is an enlarged side view of the cooker, parts being broken away to show interior construction;

Fig. 4 is a transverse sectional view thereof, taken on line 4—4 of Fig. 3, the drum inlet and outlet doors being shown in open position with the can feeding and discharging means connected respectively to the inlet and outlet opening;

Fig. 5 is an end view of the drum showing the alternating reversing mechanism;

Fig. 6 is a vertical sectional view of two of the gears of the alternating reversing mechanism showing means for locking the gears together; and Fig. 7 is a diagrammatic view of three cookers connected to a single can feeding and discharging means.

Referring to the drawings, the numeral 8 indicates a horizontally extending cylindrical or drum cooker which is supported upon legs 9 and closed at its opposite ends by heads 10 and 11. The drum is provided with an upper inlet opening 12 and a lower outlet opening 13 closed and sealed by like screw clamped doors 14 which are closed during the processing period. The drum is provided with a rotary carrier 15 formed in part of spoked spiders 16.

The opposite end spiders are respectively mounted on opposite end shafts 17 and 18 while the intermediate spiders are mounted on a sleeve 19. Said sleeve is provided with opposite and intermediate rigid heads 20 into which the opposite shafts 17 and 18 extend. The end heads 20 and the end spiders 16 are keyed to their respective shafts, as indicated by the numeral 21, and form in substance a continuous drum shaft. Longitudinally extending angle bars 22 are mounted on the peripheral portions of the spaced spiders and one angle of each bar extends radially and the other circumferentially. Said bars extend in spaced parallel relation to the axis of the carrier and said bars are spaced apart a distance less than the diameters of the cans or food containers 23 so that said cans cannot pass therebetween. The bars coact with a spirally trending guide track member 24 which is positioned within the drum and surrounds the carrier, and is connected to the inner periphery of said drum. The said guide member is formed of metal of T-shape, in cross-section, with the stem portion 24' of the T extending radially inwardly to form a continuous end guide for the cans.

The convolutions of the spiral member are spaced apart a sufficient distance to permit the cans to roll on the cross portions and between the radial stems while being moved by the carrier and advanced by the spiral member.

The upper portion of the drum is formed with a duct 25 having water or steam inlet pipes 26, and the portion of the drum forming part of the duct is provided with perforations 27 for spraying the cans with steam or hot or cold water.

The drum head 10 is provided with valved inlet pipes 28 for spraying steam into the end of the drum, but not directly on the cans. Outlet pipes 29 closed by valves (not shown) are provided for discharging the water or steam from the drum when desired.

A longitudinally extending shaft 30 mounted on the upper portion of the drum extends outwardly to the head portion 10 and has a driving connection with the drum shaft 17 by a train of gears 31. These gears are for continuous operation of the carrier as in loading or unloading the drum, or in some forms of food which do not require agitation while cooking. The inner end of the shaft has mounted fast thereon a pulley 32 which is driven by a belt 33, and said belt extends upwardly at an angle to a clutch pulley 34 mounted loosely on a countershaft 35. Another clutch pulley 36 is loosely mounted on the shaft 35 and a clutch lever 37 having a pivotal connection with the clutch operating member 38 is adapted to engage or disengage either pulley 34 or 36 mounted on the shaft 35. Said shaft is driven by a pulley 37' and a belt 38' from a distant source of power.

The outer end of the shaft 18 carries a gear wheel 39 which is in mesh with a gear wheel 40 loosely journaled on a short stud shaft 41. Said shaft 41 is mounted fast in a bracket member 42 rigidly mounted on the drum head 11 of the drum. A pinion or gear 43 also loosely journaled on the stud shaft 41 is provided with a spring actuated bolt 44 which is adapted to lock the two gears 40 and 43 together, when desired. The handle 44' of the spring bolt 44 is provided with a pin member 45 which, when the bolt 44 is pulled outwardly and slightly turned to engage the side portion of the outer gear 43, will hold the bolt in unlocked position, as indicated by dotted lines in Fig. 6. A segmental rack 46 forms part of an A-shaped oscillating member 47, and said member 47 is connected at its upper end to a pivot pin 42' projecting outwardly from the upper portion of the bracket member 42, so that when the member 47 is oscillated, it will rotate the gears 43, 40 and 39, and thus alternately rotate the can carrier 15.

A train of gears 48 is mounted on the drum and includes a large gear 48' and said gear 48' is provided with a wrist pin 49 which is pivotally connected to a link or connecting rod 50. The opposite end of the link 50 is pivotally connected to the oscillating member 47 by a pin 51 to oscillate the member 47 when the train of gears 48 is rotated.

The shaft of one of the gears of the train carries a pulley 52 which is driven by a belted connection 53 with the clutch pulley 36, so that when the operating lever 37 is swung to the right, the carrier within the drum will be continuously rotated, and when the operating lever is swung to the left, the said carrier will be alternately rotated in opposite directions unless the bolt 44 is disengaged from the gear 40. When disengaged, and the carrier is being rotated continuously, only the two gears 40 and 39 will be rotated.

An inclined can-way 54 is provided for feeding cans to the carrier, and a similar can-way 55 for discharging cans from the carrier. In the diagrammatic view shown in Fig. 7, the three drums 8 are connected to the feed can-way 56 and the discharge can-way 57 by branch can-ways 56' and 57'. Two of the branch feed can-ways 56' are provided with valves 58 which may be swung upwardly to close the branch can-ways when so desired, to permit feeding only one of the drums being charged, while the next one is processing, and the third one is being discharged, thus providing for continuously operating the can-ways and running the drums.

In operation, the inlet door of the drum is opened, and the can-way is connected to the door-way of said drum. In filling the drum, the controlling lever 37 is swung to the right to continuously rotate the drum at the same speed the cans are fed thereto until the drum is filled, with the exception of two or two and a half convolutions of the spiral carrier at the discharge end of the drum. The vacant spaces will form at the upper portion of the carrier, and approximately one and one-half portions of the convolutions of the carrier to the right of the inlet are not filled. When the carrier is thus filled the spring bolt 44 is released to engage the gear 40 and the clutch lever 37 is then swung to the left to rotate the train of gears 48 and rock the oscillating member 47. This movement through the gears 43, 40 and 39 will alternately rotate the can carrier approximately one and one-quarter revolutions in each direction to properly agitate the cans. The connecting rod speed is not uniform, due to the different angles of travel by the said rod, but the before mentioned movement of the carrier will, in connection with the stopping of the movement of the carrier at a predetermined point, provide a uniform agitation of the cans. After the food has been processed, the food may if desired be cooled by water spray or flood-cooled by admitting water through the pipes 26 or 28. After completing the cooling, the operation is stopped, the bolt 44 is withdrawn from the gear 40 and the inlet and outlet doors are opened, and the clutch lever 37 is then swung to the right to continuously rotate the carrier to discharge the processed cans while at the same time the carrier may be refilled, if desired, thus providing a continuous operation. In the diagrammatic form shown in Fig. 7, the feed and discharge can-ways are continuously operated and the drums are filled and the cans of food processed and then discharged in the regular manner to form a continuous operation.

While the specification has described the machine particularly as a pressure cooker, it is to be understood that it may also be used as an atmospheric type cooker in which the inlet door may be left open.

From the foregoing description it will be seen that the automatic cooker is of simple construction and is well adapted for the purpose described.

What I claim as my invention is:

1. An automatic cooker, comprising a drum having an inlet opening and an outlet opening, a carrier within the drum, means for feeding cans of food into the inlet opening to the carrier, means for rotating the carrier in one direction to charge or discharge the cans into or out of the carrier, means for heating the cans carried by the carrier, means for alternately rotating the carrier in opposite directions to agitate the cans carried by the carrier, and means for receiving the cans discharged through the discharge opening of the drum.

2. An automatic cooker, comprising a drum having inlet and outlet openings provided with doors, a carrier journaled in the drum, means for feeding cans of food through the inlet opening to the carrier, means for rotating the carrier as the cans are fed thereto or discharged therefrom, means for heating the cans within the drum, and other means for alternately rotating the carrier in opposite directions to agitate the food within the cans.

3. An automatic cooker, comprising a drum for receiving a heating medium and having inlet and outlet openings provided with doors, a carrier within the drum for moving cans of food back and forth and from the inlet to the outlet opening, a can-way for feeding cans to the inlet opening, a can-way for removing cans from the outlet opening, means for rotating the carrier in one direction to charge the carrier with cans of food and to discharge the cans from the carrier to the discharge can-way, and other means for rotating the carrier alternately in opposite directions to agitate the food within the cans.

4. An automatic cooker, comprising a horizontal drum for receiving a heating medium and having inlet and outlet openings provided with doors, a spiral member within the drum, a carrier within the drum and coacting with the spiral member in moving cans of food back and forth and from the inlet to the outlet opening, a can-way for removing cans from the outlet opening, a can-way for feeding cans into the inlet opening, means for rotating the carrier in one direction to charge the carrier with cans of food and to discharge the cans from the carrier, and other means for rotating the carrier alternately in opposite directions to agitate the food within the cans.

5. An automatic cooker, comprising a drum for receiving a heating medium and having inlet and outlet openings provided with doors, a spiral member within the drum, a can carrier within the drum and coacting with the spiral member, means for feeding a predetermined number of cans, less than the capacity of the carrier, to the carrier and for discharging cans therefrom, and means for rotating the carrier alternately in opposite directions to agitate the food within the cans.

6. An automatic cooker, comprising a drum having inlet and outlet openings provided with doors, means positioned adjacent the upper portion of the drum for spraying a heating medium into the drum, a spiral member mounted within the drum and extending from one end to the other, a can carrier within the drum and coacting with the spiral member to move cans spirally from the inlet to the outlet opening of the drum, means for feeding cans of food into the inlet opening and to the carrier, means for rotating the carrier to advance and discharge the cans through the outlet opening, and means for alternately rotating the carrier in opposite directions to agitate the food within the cans.

7. An automatic cooker, comprising a drum having inlet and outlet openings provided with doors, means positioned adjacent the upper portion of the drum for spraying a heating medium into the drum, a spiral member mounted within the drum and extending from one end to the other, a rotary can carrier within the drum and coacting with the spiral member to move cans spirally from the inlet to the outlet opening of the drum, means for rotating the carrier in one direction to load and unload the carrier, and a reciprocal means for alternately rotating the carrier in opposite directions to agitate the food within the cans.

8. An automatic cooker, comprising a drum having inlet and outlet openings provided with doors, means positioned adjacent the upper portion of the drum for spraying a heating medium into the drum, a spiral member mounted within the drum and extending from one end to the other, a rotary can carrier within the drum and coacting with the spiral member to move cans spirally from the inlet to the outlet opening of the drum, a gear means for rotating the carrier in one direction to load and unload the carrier, and a reciprocal means including a train of gears for alternately rotating the carrier in opposite directions to agitate the food within the cans.

9. An automatic cooker, comprising a drum having inlet and outlet openings provided with doors, means positioned adjacent the upper portion of the drum for spraying a heating medium into the drum, a spiral member mounted within the drum and extending from one end to the other, a rotary can carrier within the drum and coacting with the spiral member to move cans spirally from the inlet to the outlet opening of the drum, a shaft journaled on the drum and having a geared connection with the carrier, means for rotating the shaft in one direction to load and unload the carrier, a second shaft journaled on the drum and having a connection with a train of gears, an oscillating segmental rack member pivotally connected to a support and having a geared connection with the carrier, and a link connected to the segmental member and having a wrist pin connection with one of the gears of the train to alternately rotate the carrier in opposite directions.

10. An automatic cooker, comprising a drum having inlet and outlet openings provided with doors, means positioned adjacent the upper portion of the drum for spraying a heating medium into the drum, a spiral member mounted within the drum and extending from one end to the other, a rotary can carrier within the drum and coacting with the spiral member to move cans spirally from the inlet to the outlet opening of the drum, a shaft journaled on the drum and having a geared connection with the carrier, means for rotating the shaft in one direction to load and unload the carrier, a second shaft journaled on the drum and having a connection with a train of gears, an oscillating segmental rack member pivotally connected to a support and having a geared connection with the carrier, means for locking two of the gears of the geared connection together when desired, and a link connected to the segmental member and having a wrist pin connection with one of the gears of the train to alternately rotate the carrier in opposite directions.

11. An automatic cooker, comprising a drum having inlet and outlet openings provided with doors, the upper portion of the drum being formed with a means for spraying a heating medium into the drum, a fixed spiral member mounted within the drum and extending from one end to the other, a rotary can carrier within the drum and coacting with the spiral member to move cans spirally from the inlet to the outlet opening of the drum, a shaft journaled on the drum and having a geared connection with the carrier for rotating the carrier to load and unload the same, a second shaft journaled on the drum and having a connection with a train of gears, a segmental rack member pivotally connected to the drum, gear members connecting the rack member to the carrier, two of said gear members being locked together by a releasable bolt member, one of the gears of the train having an eccentrically projecting wrist pin, and a link connected to the wrist pin and to the segmental rack member to alternately rotate the carrier in opposite directions.

12. An automatic cooker, comprising a drum having inlet and outlet openings provided with doors, the upper portion of the drum being formed with a means for spraying a heating medium into the drum, a fixed spiral member mounted within the drum and extending from one end to the other, a rotary can carrier within the drum and coacting with the spiral member to move cans spirally from the inlet to the outlet opening of the drum, a shaft journaled on the drum and having a geared connection with the carrier for rotating the carrier to load and unload the same, a second shaft journaled on the drum and having a connection with a train of gears, a segmental rack member pivotally connected to the drum, gear members connecting the rack member to the carrier, two of said gear members being locked together by a releasable bolt member, one of the gears of the train having an eccentrically projecting wrist pin, a link connected to the wrist pin and to the segmental rack member to alternately rotate the carrier in opposite directions, and clutch means operable to control the rotating of either shaft.

13. In food processing apparatus, a plurality of heated drums, each provided with inlet and outlet openings closed by doors and carriers for moving cans of food from the inlet to the outlet openings, a single can-way for selectively feeding cans of food into all of the inlet openings, a single can-way for removing cans from all of the outlet openings in selective order, means for rotating the carriers to receive cans of food and for discharging the cans of food from the carrier, and other means for alternatingly rotating each carrier in opposite directions to agitate the food within the cans.

14. In food processing apparatus, a plurality of horizontal drums, each provided with inlet and outlet openings closed by doors and carriers for moving cans of food from the inlet to the outlet openings, means for heating the interiors of the drums, means for cooling the interiors of the drums, a single can-way for feeding cans of food into all of the inlet openings in selective order, a single can-way for removing the cans of food from all of the outlet openings in selective order, and means for alternatingly rotating each carrier in opposite directions for predetermined periods of time to agitate the food within the cans.

15. In food processing apparatus, a plurality of horizontal drums, each provided with inlet and outlet openings closed by doors and carriers for moving cans of food from the inlet to the outlet openings, means for heating the interiors of the drums, means for cooling the interiors of the drums, a single can-way for feeding cans of food into all of the inlet openings in selective order, a single can-way for removing the cans of food from all of the outlet openings in selective order, geared means for rotating the carriers in a direction to charge and discharge the cans to and from the carriers in selective order, and other geared means including segmental levers for rotating each carrier in opposite directions for predetermined periods of time to agitate the food in the cans.

16. An automatic cooker, comprising a drum for receiving a heating medium and having an inlet and an outlet opening, a continuous can path extending to and through the inlet opening of the drum and through the drum in a single cylindrical spiral path to the outlet opening thereof and to a point of discharge, and a reverse motion means for holding and agitating the cans while traveling through the drum.

17. An automatic cooker, comprising a continuous can path extending from a receiving end to a discharge end, a drum enclosing a single cylindrical spiral path portion of the can path and having an inlet opening and an outlet opening through which the can path extends, means for heating the cans while passing through the drum, and means for agitating the cans with a back and forth movement while passing through the drum.

In testimony whereof, I affix my signature.

FRANK D. CHAPMAN.